United States Patent
Tong et al.

(10) Patent No.: US 8,532,150 B1
(45) Date of Patent: Sep. 10, 2013

(54) GENERATING LASER LIGHT OF HIGH BEAM QUALITY AND HIGH PULSE QUALITY IN LARGE MODE AREA FIBER AMPLIFIERS BASED ON SUPPRESSION OF HIGH OPTICAL MODES BY FIBER COILING

(75) Inventors: Sha Tong, Mountain View, CA (US); Jerry Prawiharjo, Sunnyvale, CA (US); Anthony Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 161 days.

(21) Appl. No.: 13/247,114

(22) Filed: Sep. 28, 2011

Related U.S. Application Data

(60) Provisional application No. 61/516,343, filed on Apr. 1, 2011.

(51) Int. Cl.
*H01S 3/30* (2006.01)

(52) U.S. Cl.
USPC .................. 372/6; 372/9; 372/39; 372/69

(58) Field of Classification Search
USPC .................................... 372/6, 9, 39
See application file for complete search history.

(56) References Cited

U.S. PATENT DOCUMENTS

| | | | |
|---|---|---|---|
| 8,353,899 B1 * | 1/2013 | Wells et al. | 606/10 |
| 2010/0189392 A1 * | 7/2010 | Rockwell et al. | 385/28 |
| 2011/0249321 A1 * | 10/2011 | Savage-Leuchs et al. | 359/341.3 |

* cited by examiner

*Primary Examiner* — Dung Nguyen
(74) *Attorney, Agent, or Firm* — Perkins Coie LLP

(57) ABSTRACT

Techniques and devices for generating laser light that use large mode area fiber amplifiers and designed coiling fiber sections to achieve desired operations in a fundamental fiber mode with high pulse quality and optical beam quality while reducing presence of high order fiber modes in continuous wave (CW) and pulsed laser devices.

26 Claims, 6 Drawing Sheets

GENERATING LASER LIGHT OF HIGH BEAM QUALITY AND HIGH PULSE QUALITY IN LARGE MODE AREA FIBER AMPLIFIERS BASED ON SUPPRESSION OF HIGH OPTICAL MODES BY FIBER COILING

PRIORITY CLAIM AND RELATED PATENT APPLICATION

This patent document claims the priority of U.S. Provisional Application No. 61/516,343 entitled "Large Mode Area Fiber Amplifier Design for High Energy Output for Chirp Pulse Amplifier" and filed Apr. 1, 2011 by Sha Tong, Jerry Prawiharjo and Anthony Hong Lin, the disclosure of which is incorporated by reference as part of the disclosure of this document.

BACKGROUND

This document relates to generation of laser light by using optical fiber amplifiers in fiber lasers including pulse fiber lasers.

Fiber amplifiers can be used to amplify continuous wave (CW) and pulsed laser light in a wide range of applications. Pulsed fiber lasers with fiber optical amplifiers have a wide range of applications, including, e.g., optical communications, optical imaging, laser material processing, laser surgery in ophthalmology and surgical procedures, various laser-based biomedical applications, spectroscopic measurements, optical sensing applications, and laser displays. Pulsed fiber lasers can be configured to be compact, reliable and easy to operate and can be further configured to generate laser pulses with various pulse parameters suitable for different applications. For example, pulsed fiber lasers can be configured as ultra short pulsed (USP) lasers with high peak power and a pulse duration of around 1 picosecond or less.

SUMMARY

This document describes techniques and devices for generating laser light that use large mode area fiber amplifiers and designed coiling fiber sections to achieve desired fiber mode operations while reducing presence of high order fiber modes in continuous wave (CW) and pulsed laser devices.

In one aspect, a method for generating laser light is provided to include directing laser light first into a passive large mode area fiber that supports a first fundamental fiber mode and first higher order fiber modes and then into an active large mode area fiber that supports a second fundamental fiber mode and second higher order fiber modes and is doped to amplify light to produce amplified laser light. The passive large mode area fiber and the active large mode area fiber are spliced to connect to each other. This method includes coiling the passive large mode area fiber to have a coiling portion that selects light in the first fundamental fiber mode to transmit through the passive large mode area fiber into the active large mode area fiber for amplification while suppressing first higher fiber modes in light output by the passive large mode area fiber; and coiling the active large mode area fiber to have a coiling portion that selects light in the second fundamental fiber mode to transmit through, and to be amplified by, the active large mode area fiber while suppressing light in the second higher fiber modes in light output by the active large mode area fiber.

In another aspect, a fiber laser device for generating laser pulses is provided to include a pulsed seed laser that produces initial laser pulses; an optical pulse stretcher located down stream from the pulsed seed laser to stretch durations of the initial laser pulses to produce stretched laser pulses that have a reduced peak power relative to the initial laser pulses; and a passive large mode area fiber that supports a first fundamental fiber mode and first higher order fiber modes, and is coupled to receive the stretched laser pulses from the optical pulse stretcher. The passive large mode area fiber is structured to include a coiling portion that selects light in the first fundamental fiber mode to transmit through the passive large mode area fiber while suppressing first higher fiber modes in light output by the passive large mode area fiber. An active large mode area fiber is provided and is spliced to connect to the passive large mode area fiber to receive light output by the passive large mode area. The active large mode area fiber is structured to support a second fundamental second fiber mode and second higher order fiber modes and doped to amplify light to produce amplified laser pulses from the light from the passive large mode area fiber and the active large mode area fiber includes a coiling portion that selects light in the second fundamental fiber mode to transmit through while suppressing light in the second higher fiber modes in light output by the active large mode area fiber. This device includes a pulse compressor that receives light output by the active large mode area fiber and compresses a pulse duration of each laser pulse to produce amplified and compressed output laser pulses with a high peak power.

In yet another aspect, a fiber laser device for generating laser pulses is provided to include a laser that produces initial laser pulses, an optical pulse stretcher located down stream from the pulsed seed laser to stretch durations of the initial laser pulses to produce stretched laser pulses that have a reduced peak power relative to the initial laser pulses, a passive large mode area fiber and an active large mode area fiber. The passive large mode area fiber is structured to primarily support a first fundamental fiber mode while suppressing higher order fiber modes, and includes an input straight fiber portion without significant bending or coiling coupled to receive the stretched laser pulses from the optical pulse stretcher, a coiling portion that is coiled to select light in the first fundamental fiber mode to transmit through the passive large mode area fiber while suppressing higher fiber modes in light output by the passive large mode area fiber, and an output straight fiber portion without significant bending or coiling. The active large mode area fiber is structured to primarily support a second fundamental fiber mode while suppressing higher order fiber modes and is doped to amplify light to produce amplified laser pulses from the light from the passive large mode area fiber, the active large mode area fiber including a straight input fiber portion without significant bending or coiling that is spliced to the output straight fiber portion of the passive large mode area fiber to form a splicing fiber connection that is also straight without significant bending or coiling, a coiling portion that is coiled to select light in the second fundamental fiber mode to transmit through while suppressing light in higher fiber modes in light output by the active large mode area fiber, and an output straight fiber portion without significant bending or coiling. In this device, a pulse compressor is provided and receives light output from the output straight fiber portion of the active large mode area fiber and compresses a pulse duration of each laser pulse to produce amplified and compressed output laser pulses with a high peak power.

These and other aspects, their implementations and other features are described in detail in the drawings, the description and the claims.

DETAILED DESCRIPTION

The techniques and devices for generating laser light described in this document use large mode area fiber amplifiers. The large mode area (LMA) fiber amplifiers allow the optical power to be distributed over a relatively large cross section area to reduce the peak optical power in mitigating undesired nonlinear optical effects such as, among others, effects caused by the nonlinear Kerr effect in optical media. However, large mode area fiber amplifiers may support multiple fiber modes and various laser applications desire single mode operations, e.g., fiber lasers producing laser light with optical energy substantially in the fundamental fiber mode while having relatively small or negligible optical energy in higher fiber modes. Coiling fiber sections are provided in the disclosed fiber amplifiers and fiber lasers to force optical energy in the fundamental fiber mode operations while reducing presence of high order fiber modes.

Fiber amplifiers and fiber lasers in continuous wave (CW) and pulsed laser devices use optical fiber to confine pump light and generate amplified laser light. The amplified laser light, such as laser pulses, tend to have high optical peak power which may reach sufficiently high levels that cause undesired optical nonlinear effects in fiber and may even damage the fiber such as the doped fiber section and other optical elements. One parameter for characterizing the nonlinear optical properties is the B integral:

$$B = \frac{2\pi}{\lambda} \int n_2 / (z) dz$$

where $I(z)$ is the optical intensity at position z along the propagation direction of the beam, and $n_2$ the second-order nonlinear refractive index caused by the Kerr effect. The B integral represents the total on-axis nonlinear phase shift accumulated in a passage through the device. The designs of coiling fiber sections in fiber amplifiers described in this document can suppress the optical energy in higher fiber modes in fiber amplifiers with large B integral values. The designs can also suppress the optical energy scattering to the side of a main optical pulse due to large B integral values in a chirped pulse amplification system.

The described combination of using large mode area fiber amplifiers and designed coiling fiber sections in such fiber amplifiers can be used in both CW and pulsed fiber amplifiers and fiber lasers. The examples provided below are for pulsed fiber amplifiers and pulsed fiber lasers, including devices based on chirped pulse amplification (CPA) designs. CPA devices use a seed laser to produce seed laser pulses, a pulse stretcher that temporally stretches the pulse duration of the seed pulses to reduce the pulse peak power, one or more optical fiber amplifiers that amplify the pulse energy of the stretched laser pulses and a pulse compressor that recompresses the amplified and stretched laser pulses into high power laser pulses with desired short pulse durations.

Figure 1:
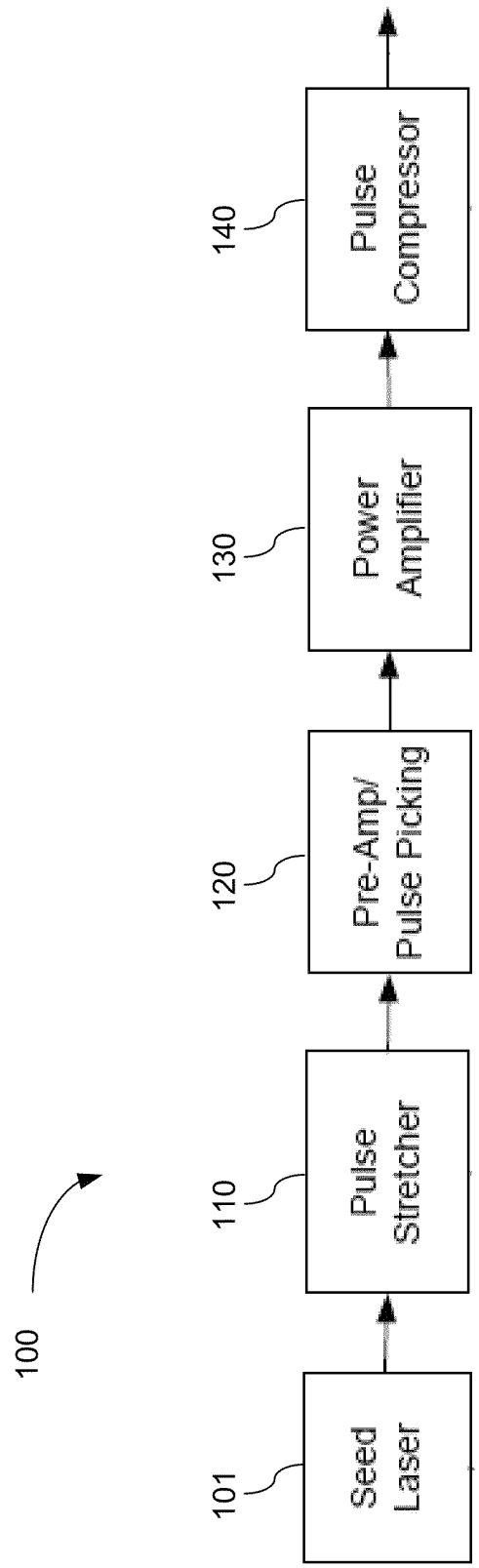
FIG. 1 shows one example of a chirped pulse amplifier system

FIG. 1 shows one example of a pulsed fiber laser device 100 based on a CPA design. This device 100 includes a seed pulsed laser 101 that generates seed laser pulses having a seed pulse duration. Downstream from the seed laser 101 is an optical pulse stretcher 110 that receives the seed laser pulses and is configured to modify the seed laser pulses to produce modified laser pulses that have a pulse duration greater than the seed pulse duration. A module 120 can be provided to include a pre optical amplifier that receives and amplifies the modified laser pulses from the optical stretcher 110 and a pulse picking function to reduce the original pulse repetition rate in the seed laser pulses. The main optical amplifier in the device 100 is the optical amplifier 130 which may include one or more fiber amplifiers. The output optical pulses of the main fiber amplifier 130 are directed into a pulse compressor 140 to compress the pulse duration to a desired short pulse duration for the output laser pulses. The fiber optic geometry of this fiber laser device 100 and other fiber laser devices tends to be inherently robust, compact, and can be directly pumped by low cost semi-conductor lasers. Laser light in the fiber is confined to a much small area and propagates over a long section of fiber resulting in nonlinear interactions between electric field and fiber glass medium, thus causing unwanted pulse distortions. Large-mode-area (LMA) double-clad fibers are used to provide an effective area that can be orders of magnitude larger than single-mode-fibers (SMFs). Commercially available LMA fibers typically have core sizes of up to 30 microns, and are engineered to have low numerical aperture (NA) for reducing the number of fibers modes. For example, the fundamental fiber mode for a fiber can be the LP01 mode and a higher order fiber mode can the LP11 mode.

Figure 2:
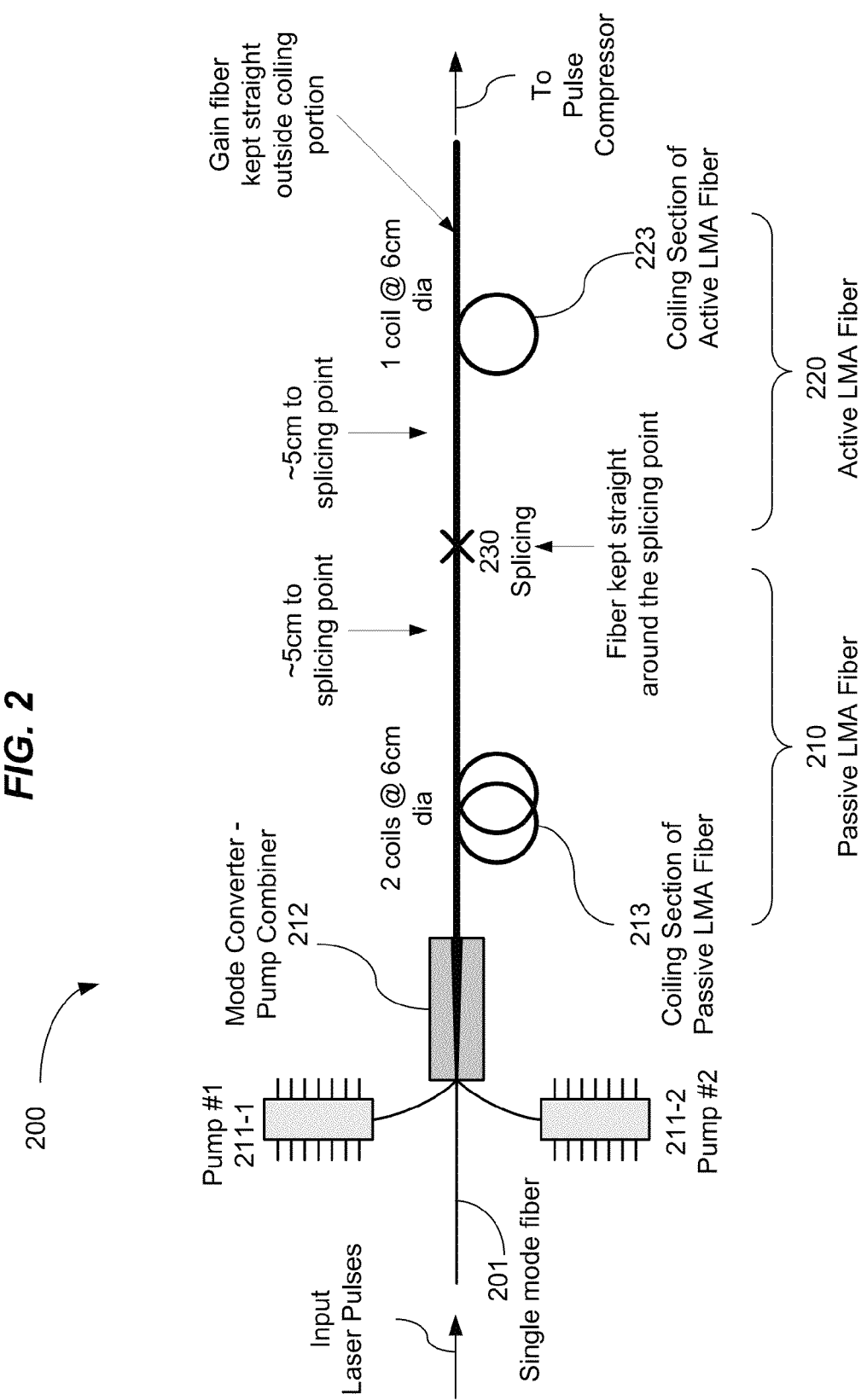
FIG. 2 shows an example implementation of the power amplifier in FIG. 1 based on a large mode-area (LMA) fiber amplifier design with fiber coiling to suppress undesired mode coupling.

FIG. 2 shows an example of a fiber amplifier 200 that can be used as the fiber amplifier 130 in FIG. 1. This fiber amplifier 200 uses a double clad large mode-area (LMA) fiber amplifier. Such a large mode-area fiber amplifier can produce higher output power with lower nonlinear effects than some fiber amplifiers and thus can be advantageous. The fiber amplifier 200 includes a passive LMA fiber part 210 that provides the pump light and an active LMA fiber part 220 that includes the doped LMA fiber gain medium to receive the pump light from the passive LMA fiber part 210 and to produce the optical gain that amplifies the input laser pulses. The passive and active LMA fiber parts 210 and 220 are spliced at a splicing location or connection 230 to connect to each other. A single mode fiber 201 is coupled to the passive LMA fiber part 210 and used as an input fiber to direct input laser pulses into the amplifier 200.

The passive LMA fiber 210 has an input coupled to a mode converter-pump combiner 212 that combines the pump light from one or more pump laser diodes (e.g., two pump laser diodes 211-1 and 211-2) and the input laser pulses into a passive LMA fiber that is coupled to the combiner 212. The combiner 212 may be implemented as a fused mode converter to adiabatically convert the fundamental mode in SMF into the fundamental mode in the passive LMA fiber 210. This passive LMA fiber 210 is not doped with gain ions and thus is a passive optical fiber. The passive LMA fiber can be configured in a double clad configuration to receive pump light from two lower brightness pump diodes 211-1 and 211-2 for a desired optical pumping level at a reduced cost.

The passive LMA fiber 210 includes an input straight fiber portion without significant bending or coiling that is coupled to the combiner 212 to receive the input laser pulses, a coiling portion 213 that is coiled to select light in the fundamental fiber mode to transmit through the passive LMA fiber 210 while suppressing higher fiber modes in light output by the passive LMA fiber 210, and an output straight fiber portion without significant bending or coiling that is connected to the active LMA fiber 220 at the splicing location 230. With the above design, the passive LMA fiber 210 is structured to primarily support its fundamental fiber mode and to suppress undesired higher order fiber modes. This coiling in the passive LMA fiber 210 provides a pre-amplification control of the fiber modes before optical amplification in the active LMA fiber 220. As such, the higher fiber modes are suppressed in the input light to the active LMA fiber 220.

The active LMA fiber 220 is structured to primarily support its fundamental fiber mode while suppressing undesired higher order fiber modes. The active LMA fiber 220 and is doped with suitable ions to amplify light to produce amplified laser pulses. The active LMA fiber 220 includes a straight input fiber portion without significant bending or coiling and this portion is spliced to the output straight fiber portion of the passive LMA fiber 210 at the splicing fiber location or connection 230, and a coiling portion 223 that is coiled to select light in the fundamental fiber mode to transmit through it while suppressing light in higher fiber modes. An output fiber portion of the active LMA fiber 220 is a straight fiber portion without significant bending or coiling and directs the laser pulses out of the active LMA fiber 220 as the output light, e.g., the output to the pulse compressor 140 in FIG. 1.

Proper coiling causes high order modes to experience higher optical loss than that of the fundamental fiber mode and thus effectively produces an optical filtering of the high order modes in the coiled fiber section. Notably, outside the coiling sections 213 and 223, other sections of the passive and active LMA fibers 210 and 220 are kept straight without significant bending or coiling to reduce undesired optical coupling between different fiber modes. At the splicing location 230, in addition to reduce undesired coupling of different fiber modes by keeping the fibers at and around splicing location 230 straight, the straight profile also creates a proper mode matching between the fundamental mode of the passive LMA fiber 210 and the fundamental mode of the active LMA fiber 220 so that the light energy in the fundamental mode of the passive LMA fiber 210 can be coupled into the fundamental mode of the active LMA fiber 220 at a high coupling efficiency. The coiling sections 213 and 223 are designed to have a coiling diameter around a critical coiling diameter around which light energy in the fundamental fiber mode (e.g., LP01) remains in the fundamental fiber mode without significant coupling to higher fiber modes (e.g., the lowest higher order mode is LP11). When the coiling diameter is significantly greater than the critical coiling diameter, light energy in the higher fiber mode is not significantly attenuated. When the coiling diameter is significantly less than the critical coiling diameter, light energy in the fundamental fiber mode is significantly attenuated and mode-mixing between the fundamental mode and higher order mode is large. Therefore, the critical coiling diameter represents an optimal coiling diameter. Proper coiling can be controlled by the coiling diameter and other parameters, such as the number of turns of the coiling section and the location of the coiling section from the splicing location 230. Some details on coiling are provided in examples below.

Various LMA fibers, such as commercial LMA fibers, have a large, low numerical aperture core that supports a few modes. The existence of higher-order-modes (HOMs) has negative impacts on both spatial beam quality and temporal pulse quality for the amplification of the laser pulses in the fiber amplifier 200. To the first degree of approximation, the beam quality of a LMA fiber is directly proportional to the content of HOMs present in the fiber. The active fiber with the fiber gain medium amplifies both the fundamental mode and HOMs and this amplification exacerbates the undesired effects caused by the presence of the HOMs. Coiling of the active LMA fiber in fiber amplifiers and lasers can reduce the undesired energy coupling to the higher fiber modes in the active LMA fiber but this coiling in the active LMA alone turns out to be insufficient in various tests and additional coiling in the passive LMA fiber on the input side of the active LMA fiber is needed to control the undesired higher fiber modes before the light enters the active LMA fiber for amplification.

The effect of HOMs on pulse quality for fiber-based amplifiers such as CPA systems is complicated. In an ideal multimode fiber, the fundamental mode could propagate without being scattered into HOMs. However, in reality, imperfections in the fiber core can provide coupling mechanisms between the fundamental fiber mode and higher fiber modes and such coupling can generate a delayed replica as a side pulse with respect to the main pulse. This delayed replica or side pulse can interfere with the main pulse and this interference can create undesired intensity and temporal phase modulations. To a certain extent, the modulations effectively serve as a phase grating and transfer the pulse energy from main pulse to side pulses. Our investigation suggests that the lower the initial pulse-contrast between the main pulse and the side pulse prior to the amplification and the higher the B-integral of the LMA amplifier, the higher the efficiency of the energy transfer from the main pulse to the one or more side pulses. The other effect of fiber imperfection is a fusion splice point which can introduce significant mode mixing of higher order fiber mode with fundamental fiber mode. Fiber fusion splice is a useful technique to join fibers together reliably, but the non-vertical cleave, core misalignment, and mode-field diameter mismatch can undesirably cause imperfection at the fusion splice point.

Figure 3A:
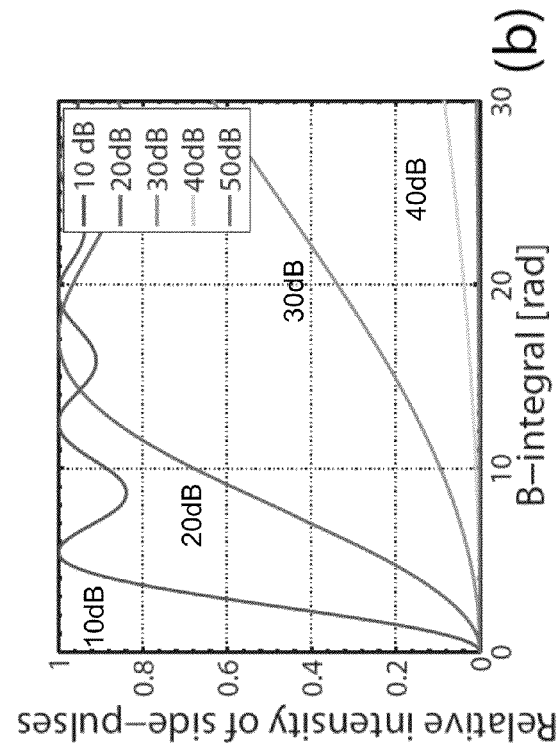
FIGS. 3A and 3B illustrate pulse quality degradation as a consequence of mode coupling in fiber device in FIG. 2 without fiber coiling to suppress undesired mode coupling.
Figure 3B:
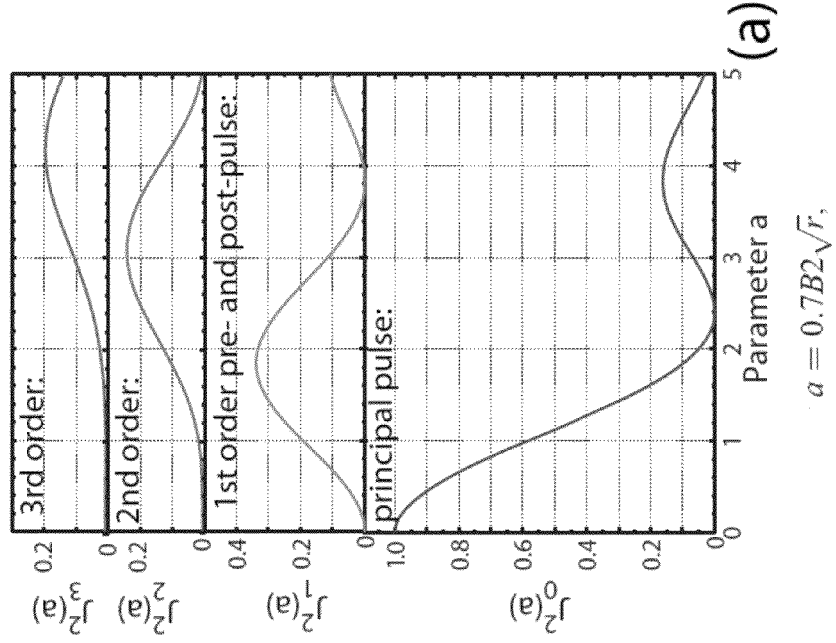

FIGS. 3A and 3B show simulations of properties of the main and side pulses generated in a CPA system in absence of the coiling design in FIG. 2. FIG. 3A shows relative intensities of the main and side pulses as a function of the parameter as defined and FIG. 3B shows the total intensity variations as a function of the B integral for the main and side pulses. The total intensity in the final side pulses relative to the intensity of the main pulse can be estimated by $$1 - J_0^2(0.7 B 2\sqrt{r}),$$

where $J_0$ is the zero-order Bessel function, B is the B-integral value and r is initial pulse contrast. The simulations are based on an initial pulse contrast of r=20 dB, a B-integral of $3\pi$ (~10) rad and the final compressed pulse has approximately 60% of energy in the side pulse. Assuming that the mode-coupling for various parts of a LMA fiber amplifier is typically 20 dB or higher, such as the fused-mode-converter pump-combiner 212, fusion-splice splicing point 230, and several meters long of the LMA gain fiber 220 as shown in FIG. 2. In absence of implementing the coiling-based HOM suppression shown in FIG. 2, the magnitude of the side pulse energy in this exemplary CPA would be significant for a large B-integral (e.g., a value greater than $\pi$ rad). In addition, the existence of HOMs alone significantly degrades the pulse quality by generating multiple pulses at the exit of the fiber due to the intermodal dispersion.

Therefore, the existence of HOMs imposes serious challenges to the design and construction of fiber-based CPA system in the tens of microJoule energy level. For example, in order to obtain a pulse with a contrast ratio of better than 13 dB, the HOM content needs to be suppressed to below than 30 dB upon launching into the active LMA fiber, assuming a 1% mode coupling coefficient and a B-integral of up to $3\pi$. For many CW or long pulse fiber laser or amplifier applications, designs and testing of LMA amplifiers by others tend to ignore any HOM content that is less than 20 dB, which is understood as limiting the LMA amplifier tolerance to B-integral of around $\pi(\sim 3)$rad. Furthermore, for many CW or long pulse fiber laser applications, HOM content in the passive LMA fiber part is not significant due to coiling of the active LMA fiber. As a result, component vendors usually suggest their customers not to coil the passive LMA fiber. Such designs fail to recognize the undesired degradation to the laser light caused by presence of seemingly relatively small or perceived to be insignificant HOMs in the input to the active LMA fiber. The coiling design in both the passive LMB fiber and the downstream active LMB fiber illustrated in the example of FIG. 2 can be used to effectively mitigate the degradation to the fundamental mode pulses and achieve high quality mode beam. For example, a high suppression of energy loss to undesired side pulses (e.g., at or greater than 30 dB) at the input of the LMA amplifier and during the amplification can be achieved by the design in FIG. 2 and this can lead to a tolerance of the B-integral of more than a factor of three or higher in some implementations.

Referring back to FIG. 2, the coiling is implemented in both the passive and active LMB fibers 210 and 220 to suppress the HOM content. The coiling in both active and passive LMA fibers 210 and 220 are controlled to be at a critical or optimal coiling diameter. In FIG. 2, the critical or optimal coiling diameter is shown to be 6 cm as an example for the prototype devices that were tested. In design, one or more the following coiling parameters can be used to create a desired coiling condition: (1) coiling diameters in the passive and active LMA fibers, respectively, where two LMA fibers may have different coiling diameters; (2) the number of coils in each of the passive and active LMA fibers, where the coil numbers of the passive and active LMA fibers can be different; (3) orientations of different coils in a coil section, e.g., two adjacent coils in a coil section can be perpendicular to each other (i.e., planes in which the two adjacent coils are in are perpendicular to each other) to balance the stresses induced by coiling in the coil section; (4) the coiling location of each coil section, (5) LMA fiber mode-coupling control, or (6) low-mode-coupling optical component selection.

In the example in FIG. 2, the fiber coiling diameter was set at 6 cm and tests indicates that the coiling-induced high loss for the HOMs was effectively and hardly any loss for the fundamental mode was measured at the output. The beam parameter product is the product of the half of the divergence angle of a beam and the radius of the beam at the beam waist. The ratio of the beam parameter product to that of an ideal Gaussian beam at the same wavelength is denoted $M^2$ and is used to characterize the beam quality. Tests conducted for the prototype devices based on FIG. 2 suggested that the beam quality parameter, $M^2$, decreases monotonically with the decrease in fiber coiling diameter. The LMA fiber generated near-diffraction-limited beam ($M^2<1.05$) at the coiling diameter of 6 cm. Tests also indicated that further reducing the coiling diameter from 6 cm actually degrades the beam quality.

The coiling in the passive LMA fiber 210 upstream from the active LMA fiber 220 in FIG. 2 cleans up the beam mode quality before the splicing at the splicing location 230. This pre-splicing beam cleanup based on proper coiling in the passive LMA fiber 210 is beneficial to establishing single-mode excitation into the active LMA fiber. The measured values of $M^2$ in conducted tests were up to 1.3 from the fused-mode-converter pump-combiner without coiling the passive LMA fiber. The beam quality can be improved to an $M^2$ of less than 1.1 after properly coiling the fiber. Coiling the active fiber further reduces the HOMs that are commonly excited at splicing point, even if the input to the active LMA fiber is the single mode input from the passive LMA fiber. Our measurements indicated that the common fusion splicing usually degrades beam quality by a factor of 10% despite careful optimization of the splicing process.

In our tests of the design in FIG. 2, two coils were formed in the passive LMA fiber in order to completely substantially eliminate the existence of HOMs. Our tests indicated $M^2$ decreases monotonically with the numbers of coils. The LMA fiber generated near diffraction limited beam ($M^2<1.05$) after two coils with a coiling diameter of 6 cm. In our tests, only one coil was formed in the active LMA fiber because additional coiling-induced stress caused by additional coils the active LMA fiber could increase the possibility of undesired mode-coupling between HOMs and fundamental mode. The selection of a single coil in the active fiber was the result of trade-off between spatial filtering and mode coupling.

In conducted tests for the design in FIG. 2, care was taken during fiber coiling to avoid inducing significant torsional stress to fiber because torsional stress can induce undesired coupling between different fiber modes.

Our tests indicated that the coiling positions should be located at proper locations to achieve effective suppression of HOMs. Coiling the passive fiber at a location too close to the splicing point 230 can induce unwanted stress in the fiber and in the splicing point 230 and this induced stress can degrade the splicing quality. Coiling in the passive fiber at a location too far from the splicing point 230 leaves excessive length of fiber between coil 213 and the splicing point 230 that may lead to additional coupling to the HOMs after the HOM cleaning by the coil 213 and thus may fail to achieve cleaning the HOMs in the laser light when reaching the splicing point 230. Coiling the active fiber at a location too far away from the splicing point 230 would allow additional mode coupling between HOMs and the fundamental mode before light reaches the coil 223 and coiling the active fiber at a location too close to the splicing point 230 may induced undesired stress to the splicing point. In our tests, coiling positions on both active and passive fibers were chosen about 5 cm on either way of the splicing point.

Various techniques can be used to provide effective LMA fiber mode-coupling control. In some implementations in controlling the mode-coupling between HOMs and the fundamental mode in the active fiber, one or more of the following can be used: (1) Using a very short gain fiber that is highly doped to reduce the fiber length and accordingly the possibility of undesired mode coupling (prototype devices based on FIG. 2 used a LMA gain fiber length of approximately 1 m); (2) keeping the spliced section straight to avoid any additional stress; (3) keeping the LMA gain fiber as straight as possible (e.g., fixing whole LMA gain fiber on a flat sheet of metal instead of wrapping around a cylindrical mandrel); (4) isolating the LMA gain fiber from turbulence air flow sources such as cooling fan; and (5) avoiding exposing the active LMA fiber to stress and high temperature.

In constructing the devices in FIGS. 1 and 2, components with low mode-coupling can be selected, e.g., active fiber with intrinsic low coupling between HOMs to the fundamental mode and robust against external disturbance, and good quality fused-mode-converter pump-combiner.

Figure 4:
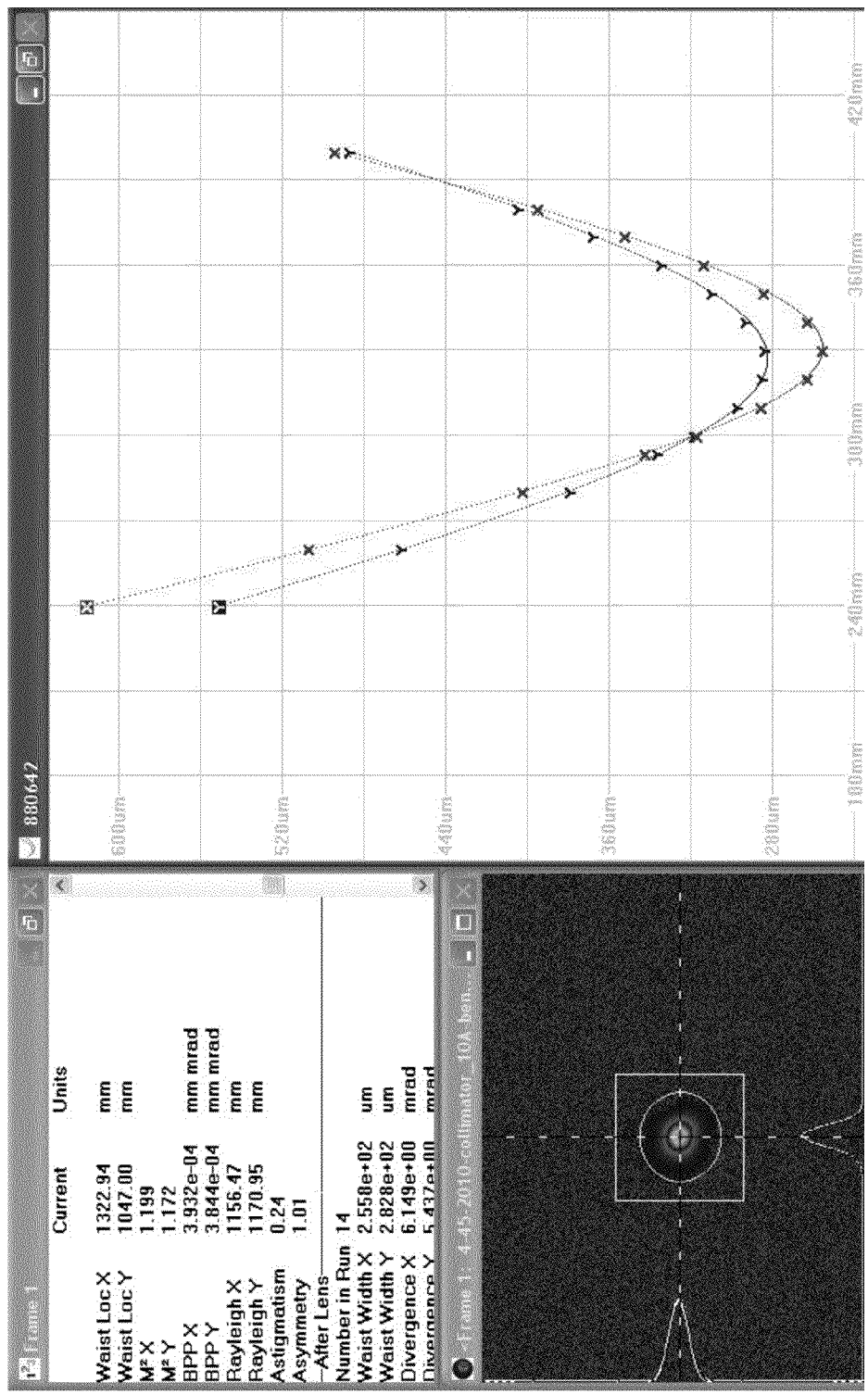
FIGS. 4, 5, 6 and 7 show various results aspects of the designs in FIGS. 1 and 2 in connection with and without fiber coiling to suppress undesired mode coupling.
Figure 5:
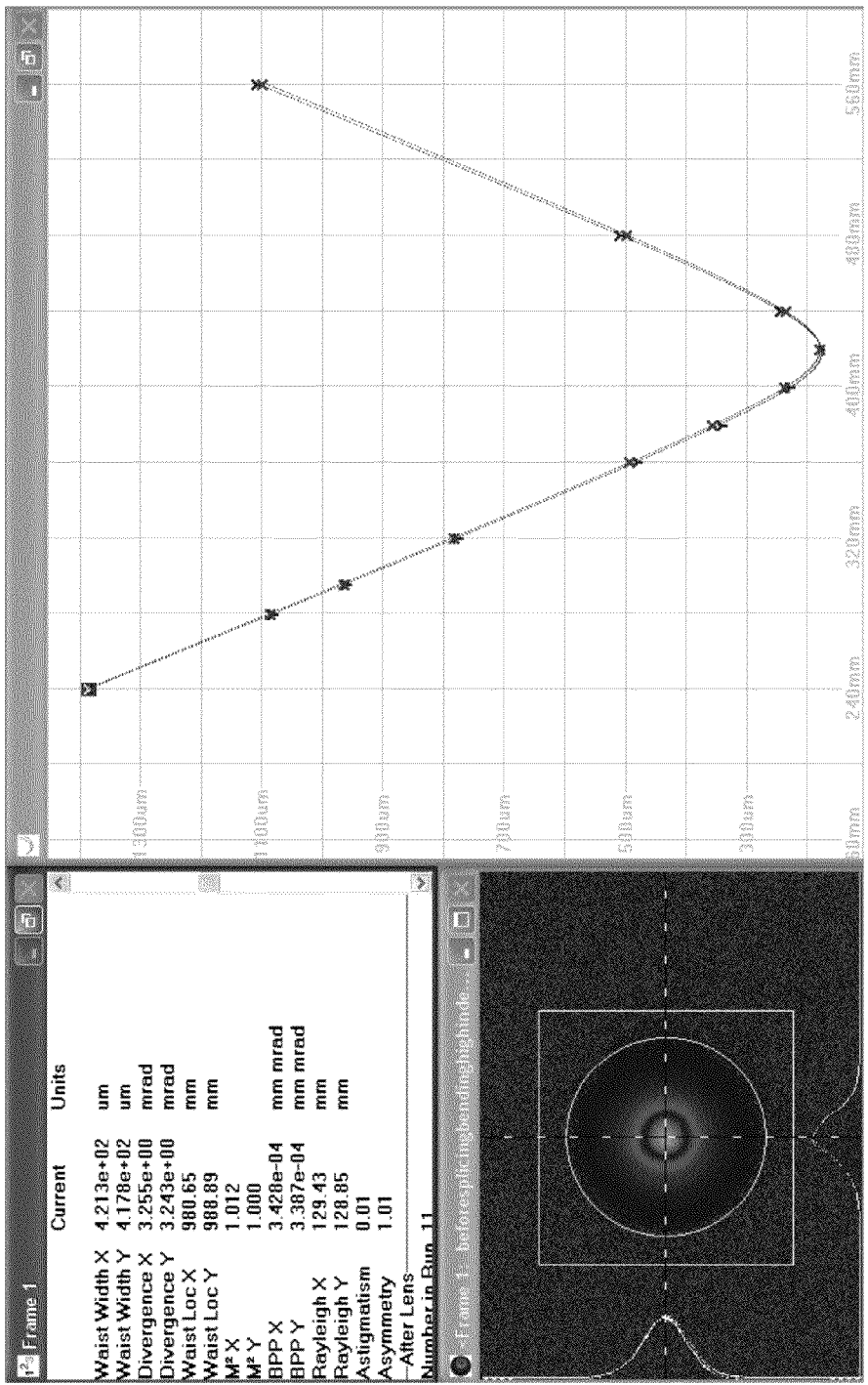
Figure 6:
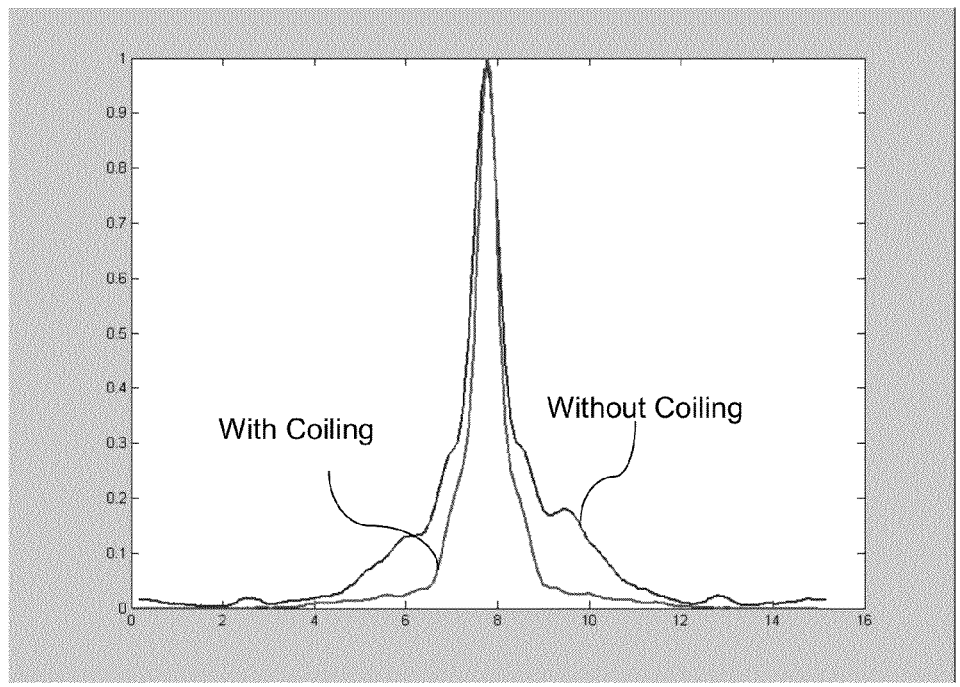

FIGS. 4, 5, 6 show various measurements of a device based on FIG. 2. Significant improvement in both beam and pulse quality was achieved after applying the coiling technique in FIG. 2.

FIG. 4 shows the amplifier beam quality in the amplifier in FIG. 2 without the coiling where the beam quality $M^2$ along x and y directions are 1.19 and 1.17, respectively. FIG. 5 shows the amplifier beam quality in the amplifier in FIG. 2 with the proper coiling in both passive and active LMA fibers where the beam quality M2 along x and y directions are 1.01 and 1.00, respectively. Significant improvement in beam quality is achieved by the coiling.

FIG. 6 compares the final compressed pulse quality with and without coiling, where the improvement of pulse quality is evident.

Figure 7:
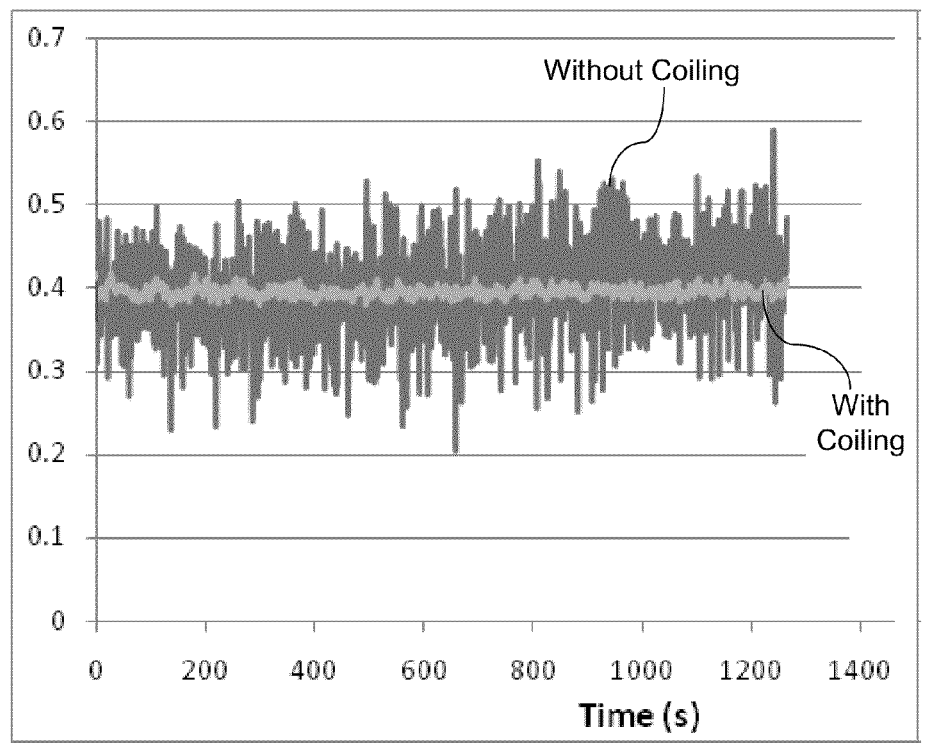

FIG. 7 compares the measured equivalent peak power variations of the final compressed pulse with coiling (center trace) and without coiling. The results clearly indicate that without coiling, the random mode coupling introduces large fluctuations on the pulse peak power, while the peak power fluctuates much less when the proper coiling in FIG. 2 was implemented.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A method for generating laser light, comprising:
directing laser light first into a passive large mode area fiber that supports a first fundamental fiber mode and first higher order fiber modes and then into an active large mode area fiber that supports a second fundamental fiber mode and second higher order fiber modes and is doped to amplify light to produce amplified laser light, the passive large mode area fiber and the active large mode area fiber being spliced to connect to each other;
coiling the passive large mode area fiber to have a coiling portion that selects light in the first fundamental fiber mode to transmit through the passive large mode area fiber into the active large mode area fiber for amplification while suppressing first higher fiber modes in light output by the passive large mode area fiber; and
coiling the active large mode area fiber to have a coiling portion that selects light in the second fundamental fiber mode to transmit through, and to be amplified by, the active large mode area fiber while suppressing light in the second higher fiber modes in light output by the active large mode area fiber.

2. The method as in claim 1, comprising:
coiling the passive and active large mode area fibers to have a coiling diameter around a critical coiling diameter, wherein the critical coiling diameter is at a value so that light energy in the first fundamental fiber mode is significantly coupled into the first higher fiber modes in the passive large mode fiber and light energy in the second fundamental fiber mode is significantly coupled into the second higher fiber modes in the active large mode fiber when the coiling diameter is significantly greater or less than the critical coiling diameter.

3. The method as in claim 1, comprising:
spacing a location of a respective coiling for each of the passive and active large mode area fibers sufficiently far from a splicing location between the coiling portion of the passive large mode area fiber and the coiling portion of the active large mode area fiber to reduce a stress in the splicing location caused by coiling of the passive and active large mode area fibers to maintain efficient coupling of light through the splicing location from the passive large mode area fiber into the active large mode area fiber.

4. The method as in claim 3, comprising:
positioning a location of the coiling portion in each of the passive and active large mode area fibers from the splicing location at a distance within a range that is less than a large distance where sufficient energy transfer from a respective fundamental fiber mode to one or more respective higher fiber modes occurs and is greater than a small distance at which the splicing location is affected by a stress caused by coiling of the passive and active large mode area fibers.

5. The method as in claim 1, comprising:
keeping a fiber section straight without being bent or coiled at a splicing location between the passive large mode area fiber and the active large mode area fiber.

6. The method as in claim 1, comprising:
keeping fiber in the passive and active large mode area fibers straight without significant bending or coiling outside the coiling portions of the passive and active large mode area fibers to reduce energy coupling between different fiber modes.

7. The method as in claim 1, comprising:
operating a seed laser to produce the laser light including initial laser pulses;
operating an optical pulse stretcher to stretch durations of the initial laser pulses while reducing peak optical power in each pulse to produce stretched laser pulses as the laser pulses that are directed into the passive large mode area fiber for amplification by the active large mode area fiber; and
compressing a pulse duration of amplified laser pulses output by the active large mode area fiber to produce amplified and compressed output laser pulses with a high peak power in each pulse.

8. The method as in claim 1, comprising:
operating a continuous wave seed laser to produce CW laser light as the laser light to be amplified.

9. The method as in claim 1, comprising:
controlling the coiling of each of the passive and active large mode area fibers to reduce torsional stress induced in each fiber.

10. The method as in claim 1, comprising:
controlling a number of coils in coiling each of the passive and active large mode area fibers to effectuate suppression of higher fiber modes.

11. The method as in claim 1, comprising:
controlling two adjacent coils in a coil section to be perpendicular to each other.

12. A fiber laser device for generating laser pulses, comprising:
  a pulsed seed laser that produces initial laser pulses;
  an optical pulse stretcher located down stream from the pulsed seed laser to stretch durations of the initial laser pulses to produce stretched laser pulses that have a reduced peak power relative to the initial laser pulses;
  a passive large mode area fiber that supports a first fundamental fiber mode and first higher order fiber modes, and is coupled to receive the stretched laser pulses from the optical pulse stretcher, the passive large mode area fiber structured to include a coiling portion that selects light in the first fundamental fiber mode to transmit through the passive large mode area fiber while suppressing first higher fiber modes in light output by the passive large mode area fiber;
  an active large mode area fiber that is spliced to connect to the passive large mode area fiber to receive light output by the passive large mode area, the active large mode area fiber structured to support a second fundamental second fiber mode and second higher order fiber modes and doped to amplify light to produce amplified laser pulses from the light from the passive large mode area fiber, the active large mode area fiber including a coiling portion that selects light in the second fundamental fiber mode to transmit through while suppressing light in the second higher fiber modes in light output by the active large mode area fiber; and
  a pulse compressor that receives light output by the active large mode area fiber and compresses a pulse duration of each laser pulse to produce amplified and compressed output laser pulses with a high peak power.

13. The device as in claim 12, wherein:
  the coiling portion of each of the passive and active large mode area fibers have a coiling diameter around a critical coiling diameter, wherein the critical coiling diameter is at a value so that light energy in a fundamental fiber mode is significantly coupled into the higher fiber modes in a respective large mode fiber when the coiling diameter is significantly greater or less than the critical coiling diameter.

14. The device as in claim 13, wherein:
  the critical coiling diameter is about 6 cm.

15. The device as in claim 12, wherein:
  a respective coiling for each of the passive and active large mode area fibers is configured to be sufficiently far from a splicing location between the coiling portion of the passive large mode area fiber and the coiling portion of the active large mode area fiber to reduce a stress in the splicing location caused by coiling of the passive and active large mode area fibers to maintain efficient coupling of light through the splicing location from the passive large mode area fiber into the active large mode area fiber.

16. The device as in claim 14, wherein:
  the coiling portion in each of the passive and active large mode area fibers is spaced from the splicing location with a distance within a range that is less than a large distance where sufficient energy transfer from a respective fundamental fiber mode to one or more respective higher fiber modes occurs and is greater than a small distance at which the splicing location is affected by a stress caused by coiling of the passive and active large mode area fibers.

17. The device as in claim 14, wherein:
  the coiling portion in each of the passive and active large mode area fibers is spaced from the splicing location with a distance of about 5 cm.

18. The device as in claim 12, comprising:
  a pump laser that produces pump light that optically pumps the active large mode area fiber to cause optical amplification of light; and
  a optical combiner coupled in an optical path between the seed laser and the passive mode area fiber and configured to receive the pump light from the pump laser and to combine the pump light with the light from the seed laser into the passive large mode area fiber.

19. The device as in claim 12, wherein:
  a fiber section at which the active large mode area fiber is spliced to connect to the passive large mode area fiber is straight without significant bending or coiling.

20. The device as in claim 12, wherein:
  the passive and active large mode area fibers are structured to keep fiber sections straight without significant bending or coiling outside the coiling portions of the passive and active large mode area fibers to reduce energy coupling between different fiber modes.

21. The device as in claim 12, wherein:
  a coiling portion in the passive large mode area fiber or active large mode area fiber includes two or more coils and two adjacent coils are oriented to be perpendicular to each other.

22. A fiber laser device for generating laser pulses, comprising:
  a laser that produces initial laser pulses;
  an optical pulse stretcher located down stream from the pulsed seed laser to stretch durations of the initial laser pulses to produce stretched laser pulses that have a reduced peak power relative to the initial laser pulses;
  a passive large mode area fiber that is structured to primarily support a first fundamental fiber mode while suppressing higher order fiber modes, and includes an input straight fiber portion without significant bending or coiling coupled to receive the stretched laser pulses from the optical pulse stretcher, a coiling portion that is coiled to select light in the first fundamental fiber mode to transmit through the passive large mode area fiber while suppressing higher fiber modes in light output by the passive large mode area fiber, and an output straight fiber portion without significant bending or coiling;
  an active large mode area fiber that is structured to primarily support a second fundamental fiber mode while suppressing higher order fiber modes and is doped to amplify light to produce amplified laser pulses from the light from the passive large mode area fiber, the active large mode area fiber including a straight input fiber portion without significant bending or coiling that is spliced to the output straight fiber portion of the passive large mode area fiber to form a splicing fiber connection that is also straight without significant bending or coiling, a coiling portion that is coiled to select light in the second fundamental fiber mode to transmit through while suppressing light in higher fiber modes in light output by the active large mode area fiber, and an output straight fiber portion without significant bending or coiling; and
  a pulse compressor that receives light output from the output straight fiber portion of the active large mode area fiber and compresses a pulse duration of each laser pulse to produce amplified and compressed output laser pulses with a high peak power.

23. The device as in claim 22, wherein:

the coiling portion of each of the passive and active large mode area fibers have a coiling diameter around a critical coiling diameter, wherein the critical coiling diameter is at a value so that light energy in a fundamental fiber mode is significantly coupled into the higher fiber modes in a respective large mode fiber when the coiling diameter is significantly greater or less than the critical coiling diameter.

24. The device as in claim 23, wherein:

the critical coiling diameter is about 6 cm.

25. The device as in claim 22, wherein:

a respective coiling for each of the passive and active large mode area fibers is configured to be sufficiently far from the splicing fiber connection between the coiling portion of the passive large mode area fiber and the coiling portion of the active large mode area fiber to reduce a stress in the splicing fiber connection caused by coiling of the passive and active large mode area fibers to maintain efficient coupling of light through the splicing location from the passive large mode area fiber into the active large mode area fiber.

26. The device as in claim 22, wherein:

the coiling portion in each of the passive and active large mode area fibers is spaced from the splicing fiber connection with a distance within a range that is less than a large distance where sufficient energy transfer from a respective fundamental fiber mode to one or more respective higher fiber modes occurs and is greater than a small distance at which the splicing location is affected by a stress caused by coiling of the passive and active large mode area fibers.

\* \* \* \* \*

UNITED STATES PATENT AND TRADEMARK OFFICE
CERTIFICATE OF CORRECTION

PATENT NO.           : 8,532,150 B1                                       Page 1 of 1
APPLICATION NO.      : 13/247114
DATED                : September 10, 2013
INVENTOR(S)          : Sha Tong et al.

It is certified that error appears in the above-identified patent and that said Letters Patent is hereby corrected as shown below:

In the Specification

In Column 2, Line 67, delete "system" and insert -- system. --, therefor.

In Column 7, Line 15, delete "LMB fiber" and insert -- LMA fiber --, therefor.

In Column 7, Line 16, delete "LMB fiber" and insert -- LMA fiber --, therefor.

In Column 7, Line 26, delete "LMB fibers" and insert -- LMA fibers --, therefor.

Signed and Sealed this
Twenty-fifth Day of November, 2014

Michelle K. Lee
*Deputy Director of the United States Patent and Trademark Office*